US009803097B2

(12) United States Patent
Bao et al.

(10) Patent No.: US 9,803,097 B2
(45) Date of Patent: Oct. 31, 2017

(54) CONDUCTIVE INKS AND CONDUCTIVE POLYMERIC COATINGS

(71) Applicant: 3M INNOVATIVE PROPERTIES COMPANY, St. Paul, MN (US)

(72) Inventors: HongQian Bao, Singapore (SG); Melvin Zin, Singapore (SG); David Julius, Singapore (SG); Melvina Leolukman, Bandung (ID)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 14/437,536

(22) PCT Filed: Oct. 21, 2013

(86) PCT No.: PCT/US2013/065919
§ 371 (c)(1),
(2) Date: Apr. 22, 2015

(87) PCT Pub. No.: WO2014/070500
PCT Pub. Date: May 8, 2014

(65) Prior Publication Data
US 2015/0275016 A1    Oct. 1, 2015

Related U.S. Application Data

(60) Provisional application No. 61/719,560, filed on Oct. 29, 2012.

(51) Int. Cl.
*C09D 11/52* (2014.01)
*H01B 1/24* (2006.01)
(Continued)

(52) U.S. Cl.
CPC ............... *C09D 11/52* (2013.01); *C09D 5/24* (2013.01); *C09D 7/1266* (2013.01);
(Continued)

(58) Field of Classification Search
CPC ...... C08K 3/04; C09D 11/037; C09D 11/106; C09D 11/324; C09D 11/52; C09D 5/24;
(Continued)

(56) References Cited

U.S. PATENT DOCUMENTS 2,798,878 A   7/1957   Hummers
8,048,214 B2  11/2011  Prud'Homme
(Continued)

FOREIGN PATENT DOCUMENTS

JP   2007-534780 A   11/2007
JP   2012-502187 A   1/2012
(Continued)

OTHER PUBLICATIONS

J. Yan et al. "Preparation of graphene/nanosheet/carbon nanotube/polyaniline composite as electrode material for supercapacitors," Journal of Power Sources 195 (2010) 3041-3045.*
(Continued)

*Primary Examiner* — Mark Kopec
*Assistant Examiner* — Jaison Thomas
(74) *Attorney, Agent, or Firm* — Qiang Han (57) ABSTRACT

A conductive ink and a conductive coating are provided. The conductive ink includes a conductive polymer solution comprising conductive polymer dissolved in an aqueous-based media and a mixture of carbon nanotubes and graphene oxide sheets dispersed in the conductive polymer solution, wherein a weight ratio of the carbon nanotubes to the graphene oxide sheets is in a range from 0.25 to 2.5. The conductive coating includes a conductive polymer and a mixture of graphene oxide sheets and carbon nanotubes dispersed in the conductive polymer, wherein a weight ratio of the carbon nanotubes to the graphene oxide sheets is in a range from 0.25 to 2.5, and wherein the conductive coating has an optical transmittance value at 550 nm of at least 75%.

15 Claims, 2 Drawing Sheets (51) Int. Cl.

| | | |
|---|---|---|
| *C09D 11/037* | (2014.01) | |
| *C09D 11/106* | (2014.01) | |
| *C09D 11/324* | (2014.01) | |
| *H01B 1/12* | (2006.01) | |
| *H01B 13/00* | (2006.01) | |
| *C09D 5/24* | (2006.01) | |
| *C09D 7/12* | (2006.01) | |
| *C08K 3/04* | (2006.01) | |

(52) U.S. Cl.
CPC .......... *C09D 11/037* (2013.01); *C09D 11/106* (2013.01); *C09D 11/324* (2013.01); *H01B 1/127* (2013.01); *H01B 1/24* (2013.01); *H01B 13/0016* (2013.01); *C08K 3/04* (2013.01)

(58) Field of Classification Search
CPC ........ C09D 7/1266; H01B 1/24; H01B 1/124; H01B 1/125; H01B 1/127; H01B 1/128; H01B 1/04; H01B 13/0016
See application file for complete search history.

(56) References Cited

U.S. PATENT DOCUMENTS

| | | | |
|---|---|---|---|
| 2004/0234445 A1 | 11/2004 | Serp | |
| 2007/0284557 A1* | 12/2007 | Gruner | B82Y 30/00 252/500 |
| 2008/0302561 A1 | 12/2008 | Prud'homme | |
| 2009/0017211 A1 | 1/2009 | Gruner | |
| 2009/0226684 A1 | 9/2009 | Bahnmuller | |
| 2010/0000441 A1 | 1/2010 | Jang | |
| 2011/0040007 A1 | 2/2011 | Chandrasekhar | |
| 2011/0127472 A1 | 6/2011 | Sato | |
| 2011/0262341 A1 | 10/2011 | Samaranayake | |
| 2011/0319554 A1 | 12/2011 | Frazier | |
| 2012/0015098 A1 | 1/2012 | Cheng | |
| 2012/0111599 A1 | 5/2012 | Roberson | |
| 2012/0128570 A1 | 5/2012 | Krishnaiah | |
| 2012/0168682 A1 | 7/2012 | Kim | |
| 2014/0320959 A1* | 10/2014 | Jun | G02B 27/22 359/464 |
| 2015/0024122 A1* | 1/2015 | Wu | C09D 11/52 427/122 |
| 2015/0114952 A1* | 4/2015 | Tai | H05B 3/84 219/549 |

FOREIGN PATENT DOCUMENTS

| | | |
|---|---|---|
| JP | 2013-035966 A | 2/2013 |
| JP | 2013-122884 A | 6/2013 |
| WO | 2008-051719 | 5/2008 |
| WO | WO 2010/112680 A1 | 10/2010 |

OTHER PUBLICATIONS

Cai, et al., Highly Conductive Carbon-Nanotube/Graphite-Oxide Hybrid Films, Advanced Materials, vol. 20, No. 9, May 5, 2008, 4 pages.
Extended European Search Report, EP13850519.3, dated May 25, 2016.
Cai et al., Highly Conductive Carbon-Nanotube/Graphite-Oxide Hybrid Films, Advanced Materials, vol. 20, No. 9, May 5, 2008, pp. 1706-1709.
Bhandari, "Poly(3,4-ethylenedioxythiophene)-Multiwalled Carbon Nanotube Composite Films: Structure-Directed Amplified Electrochromic Response and Improved Redox Activity", J. Phys. Chem. B, 2009, vol. 113, pp. 9416-9428.
Dreyer, "The chemistry of graphene oxide", Chemical Society Reviews, 2010, vol. 39, pp. 228-240.
Geim, "The rise of graphene", Nature Materials, Mar. 2007, vol. 6, pp. 183-191.
Geim, "Graphene: Status and Prospects", Science, Jun. 2009, vol. 324, pp. 1530-1534.
Hecht, "Conductivity scaling with bundle length and diameter in single walled carbon nanotube networks", Applied Physics Letters, 2006, vol. 89, pp. 133112-1-133112-3.
Hecht, "Solution-processed transparent electrodes", MRS Bulletin, Oct. 2011, vol. 36, pp. 749-755.
Hummers, "Preparation of Graphitic Oxide", J. Am. Chem. Soc., 1958, vol. 80, No. 6, pp. 1339.
Jo, "Stable Aqueous Dispersion of Reduced Graphene Nanosheets via Non-Covalent Functionalization with Conducting Polymers and Application in Transparent Electrodes", Langmuir, 2011, vol. 27, No. 5, pp. 2014-2018.
Kim, "Graphene Oxide Sheets at Interfaces", J. Am. Chem. Soc., 2010, vol. 132, pp. 8180-8186.
Kovtyukhova, "Layer-by-Layer Assembly of Ultrathin Composite Films from Micron-Sized Graphite Oxide Sheets and Polycations", Chem. Mater., 1999, vol. 11, No. 3, pp. 771-778.
Li, "Synergistic effect of hybrid carbon nantube-graphene oxide as a nanofiller in enhancing the mechanical properties of PVA composites", Journal of Materials Chemistry, 2011, vol. 21, pp. 10844-10851.
Lok, "Inkjet Printing of Multi-Walled Carbon Nanotube/Polymer Composite Thin Film for Interconnection", Journal of Nanoscience and Nanotechnology, 2010, vol. 10, No. 7, pp. 4711-4715.
Lu, "A flexible graphene/multiwalled carbon nanotube film as a high performance electrode material for supercapacitors", Electrochimica Acta, 2011, vol. 56, pp. 5115-5121.
Marcano, "Improved Synthesis of Graphene Oxide", Acsnano, Jul. 2010, vol. 4, No. 8, pp. 4806-4814.
McAllister, "Single Sheet Functionalized Graphene by Oxidation and Thermal Expansion of Graphite", Chem. Mater., 2007, vol. 19, pp. 4396-4404.
Moon, "Transparent conductive film based on carbon nanotubes and PEDOT composites", Diamond & Related Materials, 2005, vol. 14, pp. 1882-1887.
Novoselov, "Electric Field Effect in Atomically Thin Carbon Films", Science, 2004, vol. 306, pp. 666-669.
Shen, "Synthesis of Amphiphilic Graphene Nanoplatelets", Small Journal, 2009, vol. 5, No. 1, pp. 82-85.
Sinani, "Aqueous Dispersions of Single-wall and Multiwall Carbon Nanotubes with Designed Amphiphilic Polycations", J. Am. Chem. Soc., 2005, vol. 127, No. 10, pp. 3463-3472.
Sinitskii, "Chemical Approaches to Produce Graphene Oxide and Related Materials", Graphene Nanoelectronics, 2012, pp. 205-234.
Smits, "Measurement of Sheet Resistivities with the Four-Point Probe", The Bell System Technical Journal, May 1958, pp. 711-718.
Tian, "Graphene Oxides for Homogeneous Dispersion of Carbon Nanotubes" ACS Applied Materials & Interfaces, 2010, vol. 2, No. 11, pp. 3217-3222.
Tung, "Surfactant-Free Water-Processable Photoconductive All-Carbon Composite", J. Am. Chem. Soc., 2011, vol. 133, pp. 4940-4947.
Viculis, "A Chemical Route to Carbon Nanoscrolls" Science, Feb. 2003, vol. 299, p. 1361.
Yun, "Multiwall Carbon Nanotube and Poly (3,4-ethylenedioxythiophene): Polystyrene Sulfonate (PEDOT:PSS) Composite Films for Transistor and Inverter Devices", ACS Applied Materials & Interfaces, 2011, vol. 3, No. 1, pp. 43-49.
Yun, "Composite Films of Oxidized Multiwall Carbon Nanotube and Poly(3,4-ethylenedioxythiophene): Polystyrene Sulfonate (PEDOT:PSS) As a Contact Electrode for Transistor and Inverter Devices", ACS Applied Materials & Interfaces, 2012, vol. 4, pp. 982-989.
Zhang, "Size-controlled synthesis of graphene oxide sheets on a large scale using chemical exfoliation", Carbon, 2009, vol. 47, pp. 3365-3380.
Zhang, "Graphene Oxide-Assisted Dispersion of Pristine Multiwalled Carbon Nanotubes in Aqueous Media", J. Phys. Chem. C., 2010, vol. 114, pp. 11435-11440.
Zheng, "Transparent Conductive Films Consisting of Ultralarge Graphene Sheets Produced by Langmuir—Blodgett Assembly", Acsnano, 2011, vol. 5, No. 7, pp. 6039-6051.

(56) References Cited

OTHER PUBLICATIONS

International Search Report for PCT International Application No. PCT/US2013/065919 dated Dec. 18, 2013, 4 pages.
Guo et al., Assembled graphene oxide and single-walled carbon nanotube ink for stable supercapacitors, Journal of Materials Research, Apr. 2013, vol. 28, Issue 7, pp. 918-926.

* cited by examiner

CONDUCTIVE INKS AND CONDUCTIVE POLYMERIC COATINGS

CROSS REFERENCE TO RELATED APPLICATIONS

This application is a national stage filing under 35 U.S.C. 371 of PCT/US2013/065919, filed Oct. 21, 2013, which claims priority to Provisional Application No. 61/719,560, filed Oct. 29, 2012, the disclosure of which is incorporated by reference in its/their entirety herein.

TECHNICAL FIELD

The disclosure relates to conductive inks and conductive polymeric coatings having carbon nanotubes and graphene oxide sheets dispersed therein.

BACKGROUND

Transparent conductors have been used in a variety of photoelectronic and photovoltaic devices, such as flat displays, solar cells, optical communication devices, and solid-state lighting. A commonly used material for transparent conductors has been indium tin oxide (ITO), due in part to its combination of high optical transparency and low resistance. However, ITO has several drawbacks, including the rising cost of indium, the cost of setting up and maintaining a sputter deposition line, as well as the low deposition yields. ITO can also suffer from being brittle, showing cracks under relatively low strain, which leads to a sharp increase in resistance. In an attempt to address some of these issues, solution-processed conductive nanomaterials (e.g., conductive inks that include carbon nanotubes) have provided some printable alternatives to sputtering ITO.

SUMMARY

The disclosure describes conductive inks, methods of making a conductive coating, conductive coatings, and articles having a conductive coating. Advantages of conductive inks and conductive coatings of the present disclosure include improved formulation of carbon nanotube dispersions in a conductive polymer and in a conductive polymer solution, for achieving improved levels of conductivity in articles requiring a conductive coating.

In one aspect, the present disclosure describes a conductive ink that includes a conductive polymer solution. The conductive polymer solution has a conductive polymer dissolved in an aqueous-based media. A mixture of carbon nanotubes and graphene oxide sheets is dispersed in the conductive polymer solution. A weight ratio of the carbon nanotubes to the graphene oxide sheets (i.e., (weight of carbon nanotubes) divided by (weight of graphene oxide sheets)) is in a range from 0.25 to 2.5.

In another aspect, the present disclosure describes a method of providing a conductive coating, the method including applying a conductive ink of the present disclosure to a substrate, and annealing the conductive ink on the substrate to form the conductive coating on the substrate.

In another aspect, the present disclosure describes a conductive coating, including a conductive polymer, and a mixture of graphene oxide sheets and carbon nanotubes dispersed in the conductive polymer, wherein a weight ratio of the carbon nanotubes to the graphene oxide sheets is in a range from 0.25 to 2.5, and wherein the conductive coating has an optical transmittance value at 550 nm of at least 75%.

In still another aspect, the present disclosure describes an article that includes a substrate having a surface that is at least partially coated with a conductive coating of the present disclosure.

These and other aspects of the invention will be apparent from the detailed description below. In no event, however, should the above summary be construed to limit the claimable subject matter, whether such subject matter is presented in claims in the application as initially filed or in claims that are amended or otherwise presented in prosecution.

DETAILED DESCRIPTION

A conductive ink of the present disclosure includes a conductive polymer solution that can have a conductive polymer dissolved in an aqueous-based media, and a mixture of carbon nanotubes and graphene oxide sheets dispersed in the conductive polymer solution. The mixture of carbon nanotubes and graphene oxide sheets can serve as a hybrid nanofiller having useful properties for formulating conductive inks and forming conductive coatings of the present disclosure.

The term "aqueous-based media" refers to liquid media for the conductive polymer solution that includes water at a level of at least 10 weight percent, at least 20 weight percent, at least 30 weight percent, at least 40 weight percent, at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, or even at a level of at least 95 weight percent, relative to an overall weight of the aqueous-based media.

The aqueous-based media can optionally include a suitable water-miscible organic solvent. Suitable water-miscible organic solvents can include polar organic solvents having a boiling point of up to 150° C. at 1 atmosphere. In some embodiments, the water-miscible organic solvent has a dipole moment of at least 1.4 Debye. In some embodiments, examples of suitable water-miscible organic solvents can include one or more of alcohols, aldehyhdes, carboxylic acids, ethers, ketones, nitriles, or mixtures thereof. Specific examples of suitable water-miscible organic solvents can include one or more of acetaldehyde, acetic acid, acetone, dimethoxyethane, formic acid, methanol, ethanol, 1-propanol, 2-propanol, acetonitrile, 1,4-dioxane, tetrahydrofuran, or mixtures thereof. The water-miscible organic solvent, if included, can be present in the aqueous-based media at a level of up to 50 weight percent, up to 40 weigh percent, up to 30 weight percent, up to 20 weight percent, up to 10 weight percent, or even up to 5 weight percent, relative to an overall weight of the aqueous-based media. The remainder of the aqueous-based media is typically water.

Conductive inks of the present disclosure include a conductive polymer. The conductive polymer can provide a level of electrical conductivity in a conductive coating that results from applying and annealing a conductive ink of the present disclosure. The term "conductive" as used herein refers to electrical conductivity, and the term "conductive coating" refers to a coating having a sheet resistance value of less than $10^4$ ohm per square. An average sheet resistance value is typically determined for thin films using a four point probe method (see, e.g., Smits, F., "Measurement of Sheet Resistivities with the Four-Point Probe", The Bell System Technical Journal, pp. 711-718 (1958)).

Conductive polymers, or more precisely, intrinsically conducting polymers, are organic polymers that conduct electricity. They tend to have conjugated structures with alternating single and double bonds or conjugated segments coupled with atoms (e.g. N, S), providing p-orbitals for a continuous orbital overlap. The conductive polymer can include one or more of polythiophenes (e.g., poly(3,4-ethylenedioxythiophene)), polyanilines, polyacetylenes, polypyrroles, polycarbazoles, polyindoles, polyazepines, polyfluorenes, polyphenylenes, polyphenylene vinylenes (e.g., poly(p-phenylene vinylene)), polyphenylene sulfides (e.g., poly(p-phenylene sulfide)), polypyrenes, polyazulenes, and polynaphthalenes, or mixtures thereof. In some embodiments, a particularly useful conductive polymer is poly(3,4-ethylenedioxythiophene), and more preferably poly(3,4-ethylenedioxythiophene) doped with polystyrene sulfonate ("PEDOT:PSS"). PEDOT:PSS can have excellent stability to air or to heat, good transparency properties, and is lighter than conventional ITO.

The conductive polymer can be present in the conductive polymer solution at a concentration of at least 0.05 weight percent, at least 0.1 weight percent, or even at least 0.5 weight percent relative to an overall weight of the conductive polymer solution. In some embodiments, the conductive polymer is present in the conductive polymer solution at a concentration of up to 10 weight percent, up to 5 weight percent, or even up to 2 weight percent relative to an overall weight of the conductive polymer solution. In some embodiments, the conductive polymer is present in the conductive polymer solution at a concentration in a range from 0.05 weight percent to 10 weight percent, from 0.1 weight percent to 5 weight percent, from 0.5 weight percent to 5 weight percent, or even from 0.5 weight percent to 2 weight percent, relative to an overall weight of the conductive polymer solution.

It has been observed that the addition of carbon nanotubes ("CNTs") to conductive polymers can in some instances enhance the electrical conductivity of some conductive coatings. A conductive ink of the present disclosure includes CNTs. In some embodiments, CNTs can include tubular molecules similar to graphite and having an average external diameter in a range from about 1 nanometer up to 100 nanometers and an average length in a range from 0.5 micrometers up to 100 micrometers or more. CNTs can have a variety of forms including, for example: single walled carbon nanotubes ("SWCNTs"), being a single sheet of one atom thick carbon atoms in a tubular shape and having a diameter as low as about 1 nanometer; double walled carbon nanotubes ("DWCNTs"), being two sheets of one atom thick sheets of carbon atoms in a tubular form and having a diameter as low as about 2 nanometers to about 4 nanometers; and multi walled carbon nanotubes ("MWCNTs") having an appearance of concentric cylinders of one atom thick sheets of carbon atoms in a tubular form and having a diameter in a range from about 4 nanometers to about 100 nanometers.

In some typical embodiments, the CNTs are "pristine", denoting CNTs that have not undergone any surface modification treatment subsequent to synthesis and/or purification, be it chemical or otherwise.

The CNTs used in the present disclosure can be obtained commercially or prepared by methods known to those having skill in the art. SWCNTs can be prepared by various methods including, for example, inducing an arc-discharge through a carbon cathode and a carbon anode in an inert atmosphere (see, e.g., U.S. Published Patent Application No. 2011/0262341, Samaranayake et al.). The DWCNTs may be obtained by any suitable means, including, for example, contacting methane with a suitable iron on magnesia catalyst (see, e.g., U.S. Published Patent Application No. 2011/0127472, Sato et al.). The MWCNTs can be obtained by vapor deposition in the presence of a supported catalyst (see, e.g., U.S. Published Patent Application No. 2004/0234445, Sup et al.). Such MWCNTs can have a diameter ranging between 10 nm and 50 nm and a length that can attain 70 micrometers. The SWCNTs, DWCNTs, and MWCNTs can be purified by washing with acid solution (e.g., sulfuric acid, hydrochloric acid) so as to rid them of residual inorganic and metal impurities.

Suitable examples of CNTs can be obtained from commercial suppliers. For example, MWCNTs having a nominal outer diameter of 8-15 nm and a nominal length of 10-30 micrometers are commercially available under the trade designation "MWCNTS SKU-030102" from Cheap Tubes, Inc. (Brattleboro, Vt.).

It is desirable to provide aqueous-based conductive inks that include CNTs and conductive polymers, in order to obtain conductive coatings having enhanced electrical conductivity. However, efforts to formulate aqueous-based conductive inks that include CNTs are typically fraught with difficulty due to aggregation and/or precipitation of the CNTs. This aggregation and/or precipitation can be detrimental to formation of useful conductive coatings. Typically, a prerequisite for the good electrical conductivity of coatings that include CNTs is a fine dispersion of the CNTs in the coating. It is thought that when CNTs become increasingly associated with each other, the CNTs provide less conductivity enhancement than when the CNTs are finely dispersed. While various attempts have been made to provide dispersions of CNTs in aqueous-based media by, for example, adding surfactants (e.g. sodium dodecyl sulfate), the addition of such materials can sometimes introduce other difficulties including interference with desired material properties in the resulting conductive coating (e.g., transparency).

The CNTs can be present in the conductive ink in an amount sufficient to result in at least about 0.001 weight percent of CNTs in a conductive coating of the present disclosure. However, it is also typically desirable to provide the CNTs in the conductive ink in a suitable ratio with other components (and in particular with the graphene oxide material) to obtain a fine dispersion of CNTs in the conductive ink and in the resulting conductive coating. In some embodiments, CNTs can be present in the conductive ink in an amount that is sufficient to result (i.e., after applying and annealing the conductive ink on a substrate) in a conductive coating having CNTs present in a range from 0.05 weight percent to 30 weight percent, from 0.1 weight percent to 20 weight percent, from 0.2 weight percent to 10 weight percent, or even from 0.4 weight percent to 5 weight percent, relative to an overall weight of the conductive coating.

A conductive ink of the present disclosure includes graphene oxide (GO). Graphene oxide typically includes planar graphene oxide sheets ("GO sheets") having carbon atoms arranged in a layered structure similar to graphite and having an interlayer spacing approximately two times larger than the interlayer spacing found in graphite. Considering a GO sheet as oriented on an xyz-coordinate system, the x- and y-dimensions can typically be up to about 5 micrometers (or even up to 100 micrometers), while the average z-dimension (i.e., "thickness") is typically less than 5 nanometers (e.g., about 0.7 to 2 nanometers) for an individual GO sheet. GO sheets can overlap, can stack (e.g., a few layers of graphene oxide sheets can exist stacked to a thickness of up to about 10 nanometers, or more), can fold, and, importantly, can associate with other forms of carbon, including carbon nanotubes.

GO sheets, being an oxidized form of graphene, typically have oxidized functionality, including, for example, carboxyl groups (—COOH), hydroxyl groups (—OH, including phenolic —OH groups), carbonyl groups (—C(=O)), and epoxy groups (bridging oxygen atoms) displayed around edges and on major surfaces of the GO sheets. The oxidized functionality tends to increase the polarity (and hydrophilicity) of the GO sheets.

Typically, GO sheets can be prepared by exposing graphite powder to strong oxidizing conditions (including exposure to oxidizing agents such as sulfuric acid, nitric acid, potassium permanganate, potassium persulfate, hydrogen peroxide, phosphorus pentoxide, or combinations thereof), using variations of the Hummers method (e.g., see Hummers et al. "Preparation of Graphite Oxide", J. Am. Chem. Soc., 80, p. 1339 (1958); U.S. Pat. No. 2,798,878 (Hummers); and McAllister et al., "Single Sheet Functionalized Graphene by Oxidation and Thermal Expansion of Graphite", Chem. Mater., 19, pp. 4396-4404 (2007)), although other oxidation methods know to those having skill in the art can also be used.

Graphene oxide sheets can be made via chemical exfoliation of graphite in aqueous solution, by first introducing oxidized functionality on the carbon layers of graphite, followed by mild ultrasonication in water to exfoliate sheets of graphene oxide. It is thought that inter-lamellar coupling between the oxidized graphite layers becomes weakened by treatment with acids and/or hydrogen bonding with water, leading to the exfoliation of GO sheets (see, e.g., Zhang et al., "Size-Controlled Synthesis of Graphene Oxide Sheets on a Large Scale Using Chemical Exfoliation", Carbon, 47, pp. 3365-3380 (2009); and Sinitskii et al., "Chemical Approaches to Produce Graphene Oxide and Related Materials", in Graphene Nanoelectronics: From Materials to Circuits, pp. 205-234 (2012)).

In some embodiments of a conductive ink, the GO sheets can be present at a concentration of at least about 0.001 weight percent, at least 0.005 weight percent, at least 0.01 weight percent, or even at least 0.02 weight percent relative to a total weight of the conductive polymer solution. In some embodiments, the GO sheets are present in the conductive ink at a concentration of up to 0.5 weight percent, up to 0.2 weight percent, or even up to 0.1 weight percent relative to a total weight of the conductive polymer solution. In some embodiments the GO sheets are present in the conductive ink at a concentration in a range from 0.005 weight percent to 0.5 weight percent, or from 0.01 weight percent to 0.2 weight percent, or even from 0.02 weight percent to 0.1 weight percent, relative to a total weight of the conductive polymer solution.

GO sheets can be considered to be amphiphilic, having a combination of hydrophobic domains and hydrophilic domains. Embodiments of conductive inks of the present disclosure take advantage of the amphiphilic properties of GO sheets to associate with both CNT and aqueous-based media, in order to enhance the dispersion of CNTs. Without being bound by theory, it is thought that the association of GO sheets with each other and with CNTs occurs at least in part through pi-stacking interactions of their respective hydrophobic domains. The association of GO sheets with CNTs in aqueous-based media has been observed to result in enhanced dispersion of the CNTs in resulting conductive coatings, relative to an aqueous-based dispersion lacking GO sheets (e.g., see the Examples section). This enhanced dispersion results in enhanced conductivity of the conductive coating.

For a conductive ink of the present disclosure, a mixture of CNTs and GO sheets is provided. The CNTs and GO sheets can form carbon nanotube: graphene oxide ("CNT: GO") complexes, or hybrids, which can aid the dispersion of CNTs in aqueous-based media. In some embodiments, a weight ratio of carbon nanotubes to graphene oxide sheets can be in a range from 0.25 to 2.5, or from 0.5 to 2, or from 0.5 to 1.5, or even from 1 to 1.5. The weight ratio of carbon nanotubes to graphene oxide sheets should be selected to be within a range that does not result in formation of precipitates of CNTs, GO sheets, or both. The formation of dispersed CNT:GO complexes in conductive inks of the present disclosure is thought to enhance the ability to form fine dispersions of CNTs in aqueous-based media, resulting in enhanced electrical conductivity in conductive coatings formed by applying and annealing the conductive ink on a substrate.

Without wishing to be bound by theory, it is thought that low levels of CNTs in the absence of GO sheets can enhance the conductivity of conductive polymer thin films by providing conductive pathways throughout a matrix of conductive polymer, and in theory an increasing CNT concentration might provide an improvement in conductivity. However, as the amount of CNTs in the absence of GO sheets is increased, it has been observed that highly associated aggregates and/or precipitates of CNTs can form (e.g., see Comparative Example B in the Examples section).

In some embodiments, a conductive ink of the present disclosure can include a "conductivity enhancer" (or "dopant") material suitable for further enhancing the electrical conductivity of a coating resulting from application of the conductive ink to a substrate. The conductivity enhancer is selected to be able to be dispersed in the aqueous-based media and to further aid in keeping the CNTs from aggregating. In some embodiments, the conductivity enhancer is dissolved in the aqueous-based media. In typical embodiments, the conductivity enhancer has a boiling point of at least 150° C. at a pressure of 1 atmosphere. Examples of suitable conductivity enhancers can include one or more of sulfoxides, alkylene glycols, dialkylene glycols, polyalkylene glycols, polyols, phenols, or mixtures thereof. In some embodiments, specific examples of suitable conductivity enhancers can include dimethylsulfoxide (DMSO), ethylene glycol, diethylene glycol, glycerol, sorbitol, 2-methoxyphenol, or mixtures thereof.

For some examples of a conductive ink that include a conductivity enhancer (e.g., when the conductive polymer is PEDOT:PSS), it has been observed that having DMSO as the conductivity enhancer can result in significant enhancement of electrical conductivity in the final coating. Without being bound by theory, it is thought that the addition of a conductivity enhancer may aid in increasing interfacial connections among conductive regions in the conductive polymer, and possibly allow for alignment of conductive species during a drying of the conductive ink to form the conductive coating.

Other additives can optionally be provided in a range from 0.1 weight percent to about 5 weight percent relative to a total weight of the conductive ink composition. The other additives can include, for example, organic dispersants, surfactants, stabilizers, or mixtures thereof.

A conductive ink of the present disclosure can be formed by dissolving a conductive polymer in an aqueous-based media to form a conductive polymer solution, and dispersing a mixture of graphene oxide sheets, and carbon nanotubes in the conductive polymer solution. Sonication can be used to disperse GO and CNT in the aqueous-based media. The sonication time (e.g., 5 minutes to 120 minutes) and power (e.g., 20 W to 150 W) can be adjusted to aid in obtaining a dispersion of the GO and CNT in the conductive polymer solution, taking care to not induce fragmentation of CNTs by extended sonication time or elevated power conditions.

The conductive ink can be applied to a substrate by any suitable technique, for example, one or more of spray coating, dip coating, spin coating, inkjet printing, screen printing, slot die coating, doctor knife coating, curtain coating, gravure coating, knife-over-roll coating, and roll coating.

A suitable substrate of the present disclosure can be selected from one or more of a wide range of materials, including one or more of ceramic, polymeric, metallic, or combinations thereof. In some embodiments, the substrate includes a material that is flexible such as, for example, one or more of polyethylene terephthalate, polyimide, polycarbonate, biaxially-oriented polypropylene, polystyrene, polyvinyl chloride, or combinations thereof. In some embodiments, the substrate can include a flexible multilayer polymeric film that includes layers of one or more of polyethylene terephthalate, polyimide, polycarbonate, biaxially-oriented polypropylene, polystyrene, polyvinyl chloride, or combinations thereof. Flexible glass can also be used as a substrate, either alone or in combination with layer(s) of polymer materials.

In some embodiments, the substrate is selected to be transparent, flexible, or both. In some embodiments, the combination of conductive coating and substrate is selected to provide an article that is flexible, transparent, or both flexible and transparent. The term "flexible" here refers to a film of up to 125 micrometer thickness that can be wrapped around a rod having a diameter of 1 centimeter, without breaking the film. The term "transparent" refers to a layer or layers that permit at least 75% of at least a portion of incident electromagnetic radiation from about 400 nm to about 700 nm to pass through the layer or layers. The term "optical transmittance" refers to a fraction of incident electromagnetic radiation at a specified wavelength in a range from about 400 nm to about 700 nm that passes through a sample. In some embodiments the article has an optical transmittance value at 550 nm of at least 75%, at least 80%, at least 85%, or even at least 90%.

In typical embodiments, the conductive ink is annealed on the substrate. The annealing can include exposing the conductive ink on the substrate to a temperature in a range from about 80° C. to about 150° C. for a suitable time period, typically driving off most or substantially all of the water and water-miscible organic solvent (if any) from the conductive coating. The annealing can be carried out for any suitable time period, for example, in a range from 10 minutes to 120 minutes. In embodiments of suitable annealing conditions, no visible droplets (i.e., droplets having a size greater than 1 micrometer) are observed. In some embodiments, a portion of the conductivity enhancer material may also be driven off during the annealing process, although the annealing step does not typically need to include reducing the level of conductivity enhancer remaining in the conductive coating. Annealing can be performed by any suitable technique, for example, one or more of infrared heating, dielectric drying, convection drying, supercritical drying, vacuum drying, or combinations thereof. While the annealing process accomplishes at least some removal of the aqueous-based media, it is also possible that the annealing process results in the conformational change of conductive polymer chains in the conductive coating as it is being formed. It is thought that the predominant conformation can change from coil and expanded-coil to expanded-coil and linear, and that this conformational change can result in an increase in intra-chain and inter-chain charge-carrier mobility, thereby enhancing the conductivity of the conductive coating.

In some embodiments, the application of conductive ink to substrate and subsequent annealing can be performed on a "roll-to-roll" apparatus, where the substrate is provided as a continuous substrate film rolled up into a substrate film roll. The substrate film is delivered (i.e., unrolled) from the substrate film roll, transported in its longitudinal direction, and then the conductive ink is applied to the substrate film, during transportation, by any suitable method (e.g., spraying). The substrate film with conductive ink applied is then subjected to the annealing conditions, during transportation, to form the conductive coating on the substrate. The substrate film with the conductive coating thereon can then rolled up. Parameters such as line speed, conductive ink application rate, and annealing conditions can be selected by those having skill in the art, taking into account variables such as desired coating thickness and the desired duration of annealing.

Conductive coatings of the present disclosure include a conductive polymer and a mixture of GO sheets and CNTs dispersed in the conductive polymer. In some embodiments, the amount of GO sheet material in the conductive coating is at least 0.1 weight percent, at least 0.2 weight percent, at least 0.25 weight percent, at least 0.5 weight percent, or even at least 1 weight percent, relative to the total weight of the conductive coating. In some embodiments, the amount of GO sheet material in the conductive coating is up to 15 weight percent, up to 10 weight percent, or even up to 5 weight percent, relative to the total weight of the conductive coating. In some embodiments, the amount of GO sheet material in the conductive coating is in a range from 0.25 weight percent to 15 weight percent, from 0.5 weight percent to 10 weight percent, or even from 1 weight percent to 5 weight percent, relative to the total weight of the conductive coating.

In some embodiments, the amount of CNTs in the conductive coating is at least 0.05 weight percent, at least 0.1 weight percent, at least 0.2 weight percent, or even at least 0.4 weight percent, relative to the total weight of the conductive coating. In some embodiments, the amount of CNTs in the conductive coating is up to 30 weight percent, up to 20 weight percent, up to 10 weight percent, or even up to 5 weight percent, relative to the total weight of the conductive coating. In some embodiments, the amount of CNTs in the conductive coating is in a range from 0.05 weight percent to 30 weight percent, from 0.1 weight percent to 20 weight percent, from 0.2 weight percent to 10 weight percent, or even from 0.4 weight percent to 5 weight percent, relative to the total weight of the conductive coating.

In some embodiments, the conductive coating of the present disclosure can include a weight ratio of CNTs to GO sheets of at least 0.25, at least 0.5, at least 0.7, at least 0.9, or even at least 1. In some embodiments the conductive coating can include a weight ratio of CNTs to GO sheets of up to 2.5, up to 2, up to 1.5, up to 1.2 or even up to 1.1. In some embodiments, the conductive coating can include a weight ratio of CNTs to GO sheets in a range from 0.25 to 2.5, from 0.5 to 2, from 0.5 to 1.5, from 1 to 1.5, or even from 1 to 1.2.

Various embodiments of a conductive coating of the present disclosure can have an average sheet resistance value of up to 3000 ohm per square, up to 2800 ohm per square, up to 2500 ohm per square, up to 2000 ohm per square, up to 1500 ohm per square, up to 1000 ohm per square, up to 900 ohm per square, or even up to 800 ohm per square. In some embodiments, the conductive coating has an average sheet resistance value in a range from 800 ohm per square to 2800 ohm per square, from 900 ohm per square to 2800 ohm per square, or even from 800 ohm per square to 1000 ohm per square.

In some embodiments, it is desirable that the conductive polymer be transparent in the conductive coating. In some embodiments, the electrically conductive coating has an optical transmittance value at 550 nm of at least 75%, or at least 80%, or at least 85%, or at least 90%, or even at least 95%.

The conductive coating can be a film having a thickness of at least 20 nanometers, at least 30 nanometers, at least 40 nanometers, at least 50 nanometers, or even at least 60 nanometers. In some embodiments, the conductive coating is a film having a thickness of up to 250 nanometers, up to 200 nanometers, up to 150 nanometers, or even up to 120 nanometers. In some embodiments, the conductive coating is a film having a thickness in a range from 20 nanometers to 250 nanometers, from 40 nanometers to 150 nanometers, or even from 60 nanometers to 120 nanometers.

It is sometimes desirable that the conductive polymer be capable of forming a flexible conductive coating on a flexible substrate. For a flexible substrate of up to even 1 cm, at least 95% of the conductivity of the flexible coating can remain when the coated substrate is wrapped around a rod with a diameter that is 80 times the thickness of the substrate.

The annealed conductive coating can include water at a level of up to 5 weight percent, up to 4 weight percent, up to 3 weight percent, up to 2 weight percent, up to 1 weight percent, up to 0.5 weight percent, or even up to 0.1 weight percent, relative to a total weight of the conductive coating. However, it is not necessary for the conductive coating to include water in an amount up to any one of these levels in order to be electrically conductive.

The disposition of CNTs in a conductive coating of the present disclosure preferably includes "domain networks" that are an interconnection of CNTs associated with GO sheets in a small area. A typical domain network dimensions can be considered to be about 10 micrometers×10 micrometers. The CNTs in a domain network preferably are uniformly distributed in the conductive polymer.

Articles of the present disclosure can be prepared by applying a conductive ink of the present disclosure to at least a portion of surface of a substrate, followed by annealing the conductive ink on the surface of the substrate to form an article having a conductive coating. Useful articles can include, for example, electromagnetic shielding films/fabric tapes, radio-frequency identification (RFID) tags/labels, antistatic labels/films, and transparent electrodes for flexible photovoltaic cells, electrochromic devices, flexible displays, touch screens, and organic light-emitting diodes (OLEDs).

LIST OF EXEMPLARY EMBODIMENTS

Embodiment 1

A conductive ink, comprising:
a conductive polymer solution comprising conductive polymer dissolved in an aqueous-based media; and
a mixture of carbon nanotubes and graphene oxide sheets dispersed in the conductive polymer solution, wherein a weight ratio of the carbon nanotubes to the graphene oxide sheets is in a range from 0.25 to 2.5.

Embodiment 2

The conductive ink of embodiment 1, wherein the conductive polymer is present in the conductive polymer solution at a concentration in a range from 0.05 weight percent to 10 weight percent, based on a total weight of the conductive polymer solution.

Embodiment 3

The conductive ink of embodiment 1 or embodiment 2, wherein the graphene oxide sheets are present in the conductive polymer solution at a concentration in a range from 0.005 weight percent to 0.5 weight percent, based on a total weight of the conductive polymer solution.

Embodiment 4

The conductive ink of any one of embodiments 1 to 3, wherein the conductive polymer comprises one or more of polythiophenes, polyanilines, polyacetylenes, polypyrroles, polycarbazoles, polyindoles, polyazepines, polyfluorenes, polyphenylenes, polyphenylene vinylenes, polyphenylene sulfides, polypyrenes, polyazulenes, and polynaphthalenes, or mixtures thereof.

Embodiment 5

The conductive ink of any one of embodiments 1 to 4, wherein the conductive polymer comprises one or more of poly(3,4-ethylenedioxythiophene), poly(p-phenylene sulfide), poly(p-phenylene vinylene), or mixtures thereof.

Embodiment 6

The conductive ink of any one of embodiments 1 to 5, wherein the conductive polymer is poly(3,4-ethylenedioxythiophene) doped with polystyrene sulfonate.

Embodiment 7

The conductive ink of any one of embodiments 1 to 6, wherein the aqueous-based media comprises a water-miscible organic solvent, wherein the water-miscible organic solvent has a boiling point of up to 150° C. at a pressure of 1 atmosphere.

Embodiment 8

The conductive ink of any one of embodiments 1 to 7, further comprising a conductivity enhancer dissolved in the conductive polymer solution, wherein the conductivity enhancer has a boiling point of at least 150° C. at a pressure of 1 atmosphere.

Embodiment 9

The conductive ink of embodiment 8, wherein the conductivity enhancer is one or more of dimethylsulfoxide, ethylene glycol, diethylene glycol, glycerol, sorbitol, 2-methoxyphenol, or mixtures thereof.

Embodiment 10

The conductive ink of any one of embodiments 1 to 9, wherein the weight ratio of the carbon nanotubes to the graphene oxide sheets is in a range from 0.25 to 2.

Embodiment 11

A conductive coating, comprising:
a conductive polymer; and
a mixture of graphene oxide sheets and carbon nanotubes dispersed in the conductive polymer, wherein a weight ratio of the carbon nanotubes to the graphene oxide sheets is in a range from 0.25 to 2.5, and wherein the conductive coating has an optical transmittance value at 550 nm of at least 75%.

Embodiment 12

The conductive coating of embodiment 11, wherein the graphene oxide sheets are present in a range from 0.1 weight percent to 5 weight percent relative to a total weight of the conductive coating.

Embodiment 13

The conductive coating of embodiment 11 or embodiment 12, wherein the weight ratio of the carbon nanotubes to the graphene oxide sheets is in a range from 0.25 to 2, and wherein the conductive coating has an optical transmittance value at 550 nm of at least 80%.

Embodiment 14

The conductive coating of any one of embodiments 11 to 13, wherein the coating has a thickness in a range from 20 nm to 250 nm.

Embodiment 15

The conductive coating of any one of embodiments 11 to 14, wherein the conductive coating has an average sheet resistance value in a range from 800 ohm per square to 2800 ohm per square.

Embodiment 16

The conductive coating of any one of embodiments 11 to 15, wherein water is present at up to 5 weight percent of the total weight of the conductive coating.

Embodiment 17

A method of providing a conductive coating on a substrate, comprising:
applying a conductive ink according to embodiment 1 to a substrate; and
annealing the conductive ink on the substrate to form the conductive coating on the substrate.

Embodiment 18

The method of embodiment 17, wherein the annealing is performed at a temperature in a range from 80 to 150° C.

Embodiment 19

The method of embodiment 17 or embodiment 18, wherein the substrate is flexible.

Embodiment 20

The method of embodiment 17 or embodiment 18, wherein the substrate is transparent.

Embodiment 21

The method of embodiment 17 or embodiment 18, wherein the substrate is flexible and transparent.

Embodiment 22

The method of any one of embodiments 17 to 21, wherein the applying comprises one or more of spray coating, dip coating, spin coating, inkjet printing, screen printing, slot die coating, doctor knife coating, curtain coating, gravure coating, knife-over-roll coating, and roll coating.

Embodiment 23

The method of any one of embodiments 17 to 22, further comprising providing the graphene oxide sheets in the conductive ink of embodiment 17 by performing a chemical exfoliation of graphite.

Embodiment 24

The method of any one of embodiments 17 to 23, wherein the annealing comprises one or more of infrared heating, dielectric drying, convection drying, supercritical drying, vacuum drying, or combinations thereof.

Embodiment 25

The method of any one of embodiments 17 to 24, wherein the substrate is a continuous substrate film rolled up into a substrate film roll, wherein the substrate film is delivered from the substrate film roll, transported in its longitudinal direction, and subjected to the applying and annealing steps during transportation, and the substrate film with the conductive coating thereon is rolled up.

Embodiment 26

An article comprising a substrate having a surface, wherein the surface is at least partially coated with a conductive coating according to embodiment 11.

Embodiment 27

The article of embodiment 26, wherein the article has an optical transmittance value at 550 nm of at least 75%.

Embodiment 28

The article of embodiment 26 or embodiment 27, wherein the substrate is flexible.

Embodiment 29

The article of embodiment 26 or embodiment 27, wherein the substrate is transparent.

Embodiment 30

The article of embodiment 26 or embodiment 27, wherein the substrate is flexible and transparent.

Embodiment 31

The article of any one of embodiments 26 to 30, wherein the substrate comprises a material that is one or more of ceramic, polymeric, metallic, or combinations thereof.

Embodiment 32

The article of any one of embodiments 26 to 31, wherein the substrate comprises one or more of polyethylene terephthalate, polyimide, polycarbonate, biaxially-oriented polypropylene, polystyrene, polyvinyl chloride, or combinations thereof.

Embodiment 33

The article of any one of embodiments 26 to 32, wherein the substrate comprises flexible glass.

EXAMPLES

Materials

| | |
|---|---|
| Graphite powder | Natural graphite powder, <100 micrometer, Fluka, purum grade, obtained from Sigma Aldrich Chemical Company, St. Louis, MO |
| MWCNT | Multiwall carbon nanotube material having a nominal outer diameter of 8-15 nm and a nominal length of 10-30 micrometer, obtained from Cheap Tubes Inc., Brattleboro, VT, under the trade designation: "MWCNTS SKU-030102" |
| $H_2SO_4$ | Sulfuric acid, 97%, ACS reagent grade, obtained from Sigma Aldrich Chemical Company |
| $K_2S_2O_8$ | Potassium persulfate, >99%, ACS reagent grade, obtained from Sigma Aldrich Chemical Company |
| $P_2O_5$ | Phosphorus pentoxide, >98%, ACS reagent grade, obtained from Sigma Aldrich Chemical Company |
| $KMnO_4$ | Potassium permanganate, obtained from Sigma Aldrich Chemical Company |
| PEDOT:PSS | Poly(3,4-ethylenedioxythiophene) doped with poly(4-styrenesulfonate), CLEVIOS P grade, 1.3 weight percent solution in water, obtained from Heraeus, Germany |
| $NaNO_3$ | Sodium nitrate, >99%, ReagentPlus grade, obtained from Sigma Aldrich Chemical Company |
| HCl | Hydrochloric acid, 37%, ACS reagent grade, obtained from Sigma Aldrich Chemical Company |
| $H_2O_2$ | Hydrogen peroxide, 30 weight percent aqueous solution, ACS reagent grade, obtained from Sigma Aldrich Chemical Company |
| DMSO | Dimethylsulfoxide, obtained from Sigma Aldrich Chemical Company |

Preparation of Graphene Oxide (GO) Sheets

GO sheets were synthesized using a modified Hummers method from natural graphite powder, as described in the following details. Firstly, graphite powder (3 grams) was put into an 80° C. solution consisting of concentrated $H_2SO_4$ (97 weight percent, 12 mL), $K_2S_2O_8$ (2.5 grams), and $P_2O_5$ (2.5 grams). The mixture was kept at 80° C. for 6 hours using a hot plate. Successively, the mixture was cooled to room temperature and then diluted with 0.5 L of deionized water and left standing overnight. Then the mixture was filtered using a 0.2 micrometer nylon filter (obtained from Waterman International Ltd., Maidstone, England, under the trade designation "WATERMAN") and the collected solid was washed with deionized water to remove residual acid. The product was dried under ambient condition overnight to provide a pre-oxidized graphite. The pre-oxidized graphite was then subjected to further oxidation according to the following steps. Briefly, 1 gram of the pre-oxidized graphite and 0.5 gram of sodium nitrate were placed in a flask. Concentrated $H_2SO_4$ (97 weight percent, 25 mL) was added with stirring in an ice-water bath, and 3 g of $KMnO_4$ were slowly added over about 1 hour. Stirring was continued for 2 hours in the ice-water bath. After the mixture was stirred vigorously for 2 days at room temperature, 100 mL of 5 weight percent $H_2SO_4$ aqueous solution was added over about 1 hour with stirring, and the temperature was kept at 98° C. The resultant mixture was further stirred for 2 hours at 98° C. The temperature was reduced to 60° C., 3 mL of $H_2O_2$ (30 weight percent aqueous solution) was added, and the mixture was then stirred for 2 hours at room temperature. The oxidized product was collected on another 0.2 micrometer nylon membrane and rinsed with a 10% w/v HCl aqueous solution, followed by repeatedly washing with copious amounts of deionized water, to provide the GO sheet material.

Preparation and Characterization of GO-MWCNT Complex

Figure 1A:
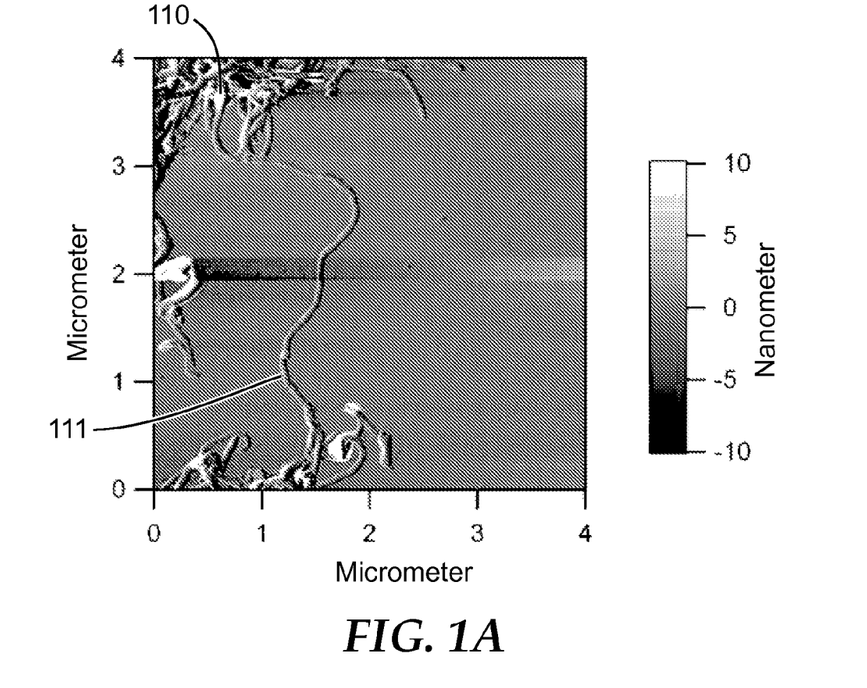
FIG. 1A is an atomic force microscopy image of a coating that includes carbon nanotubes.
Figure 1B:
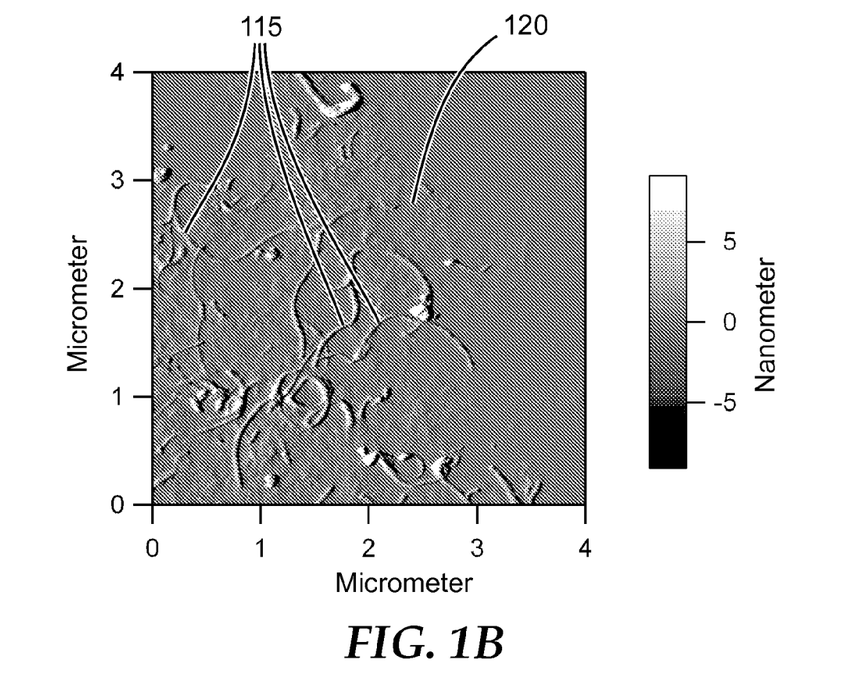
FIG. 1B is an atomic force microscopy image of a coating that includes carbon nanotubes and graphene oxide sheets.

GO sheet material prepared as described immediately above was dispersed in water (0.2 mg/mL) by ultrasonication in an ultrasound device (obtained from QSonica, LLC., Newton, Conn., under the trade designation "SONICATOR 3000") for 30 minutes at a power of 30 W, to generate a GO colloidal suspension. A sample of MWCNT was charged into the obtained GO colloidal suspension (proportion of MWCNT to GO was 1:2; the MWCNT sample as obtained was initially in the form of agglomerates), and the mixture was further ultrasonicated for 1 hour at 30 W to give a suspension of the GO-MWCNT complexes. A control suspension of MWCNTs was also prepared in the same way except that the GO sheet material was not included. The suspension of the GO-MWCNT complex and the control suspension of MWCNT were each examined by atomic force microscopic ("AFM") measurements with various modes using an AFM instrument (obtained from Asylum Research, Goleta, Calif., under the trade designation "MODEL MFP-3D-BIO"). The samples for AFM were prepared by dropping aliquots of the suspensions onto fresh silicon wafers, followed by drying them under ambient conditions. The AFM digital images in FIGS. 1A and 1B have x and y dimensions in units of micrometers, and a z dimension in units of nanometers, as indicated in the shaded bar to the right of each digital image. The AFM image in FIG. 1A showed that even with the aid of ultrasonication, the MWCNTs 111 without GO sheets did not form a stable suspension in water, but instead appeared entangled with one another, with observed precipitation and aggregation (e.g., aggregate 110). It was separately observed that GO sheet material, without added MWCNT material, formed stable and homogeneous colloidal suspension in water as well as various other polar organic solvents (e.g., GO sheet material was homogeneously dispersed in N,N-dimethylformamide at up to 2 mg/mL). FIG. 1B is an AFM digital image of the GO-MWCNT complexes that were observed in the dried AFM samples to be spaghetti-like MWCNTs 115 randomly associated with GO sheets 120, as shown in the AFM image in FIG. 1B, with no observations of serious MWCNT aggregation.

Examples 1 to 6: Preparation and Characterization of GO-MWCNT/PEDOT:PSS Conductive Inks and Conductive Coatings To fabricate a conductive ink, a 3 mL sample of GO sheet material dispersed in water (1.0 mg/mL; sonication was used to disperse the GO sheet material in water) was dispersed in 12 mL PEDOT:PSS solution (1.3 weight percent in water) to achieve a fixed concentration of the GO sheet material (0.2 milligram GO sheet material per mL of dispersion in a PEDOT:PSS solution). To each of six samples of the GO/PEDOT:PSS dispersion was added a selected amount of MWCNT to obtain the range of MWCNT to GO weight ratios for Examples 1 to 6 as shown in Table 1, below. Each of these mixtures was ultrasonicated for 1 hour at a power of 30 W to generate the GO-MWCNT/PEDOT:PSS dispersions.

TABLE 1

| Sample | Weight ratio of MWCNT to GO sheets | Optical transmittance at 550 nm, percent | Sheet resistance of coating, ohms per square |
|---|---|---|---|
| Comp. A (PEDOT:PSS) | NA | 86.8 | 4100 ± 300 |
| Comp. B (CNT/PEDOT:PSS) | NA | 81.6 | 2680 ± 150 |
| Comp. C (GO/PEDOT:PSS) | NA | 85.3 | 4000 ± 225 |
| Ex. 1 | 0.25 | 83.8 | 2800 ± 250 |
| Ex. 2 | 0.5 | 83.5 | 1880 ± 150 |
| Ex. 3 | 1.0 | 80.9 | 900 ± 100 |
| Ex. 4 | 1.5 | 80.4 | 1150 ± 180 |
| Ex. 5 | 2.0 | 80.4 | 1700 ± 180 |
| Ex. 6 | 2.5 | 78.9 | 1780 ± 250 |

NA = "not applicable"

After the ultrasonication step, dimethylsulfoxide (5% volume ratio) was incorporated into each of the GO-MWCNT/PEDOT:PSS dispersions to achieve the conductive inks of Examples 1 to 6. These inks were sprayed onto the pretreated glass substrates (pretreated by soaking and ultrasonication in acetone, 2-propanol, and deionized water for 30 minutes each) using an airbrush, and the resulting conductive coatings were annealed at 100° C. for 20 minutes. Parameters such as the pressure of compressed nitrogen gas (80 p.s.i.), spraying angle (45°) and distance (30 cm), and ink volume (2 mL) were kept consistent during all spraying processes. Thickness of the dry coatings was in a range of 60 to 120 nm. The resulting conductive coatings were designated as Examples 1-6 samples according to their initial proportion of MWCNT to GO during the formulation of corresponding inks. Control samples of PEDOT:PSS, MWCNT/PEDOT:PSS, and GO/PEDOT:PSS composite coatings (denoted as Comparative Example A, Comparative Example B and Comparative Example C, respectively) were also prepared for comparison, using essentially the same protocol. Table 1 summarizes the samples and measured properties for Examples 1 to 6 and Comparative Examples A to C.

The optical transparency of the conductive coatings deposited on glass substrates was characterized using a UV-Vis spectrometer (obtained from Varian Australia, Mulgrave, VIC, Australia, under the trade designation "CARY 50 BIO SPECTROMETER") at normal incidence. Optical transmittance values at 550 nm for Examples 1 to 6 are summarized in Table 1. Since the GO concentration was constant across Examples 1 to 6 all samples, the MWCNT concentration appeared to have a direct effect on optical transmittance. It was also visually observed that the coatings having higher MWCNT concentrations appeared less transparent.

Four-point sheet resistance measurements for Examples 1 to 6 samples were obtained using a multimeter (obtained from Agilent Technologies, Santa Clara, Calif., under the trade designation "MODEL 34401A DIGITAL MULTIMETER"), with the results summarized in Table 1. As shown, the resistivity of GO-MWCNT/PEDOT coating decreased when the weight ratio of MWCNT:GO increased from 0.25:1 to 1:1, but it climbed when the ratio further increased from 1:1 to 2.5:1. Example 3, with a weight ratio of MWCNT:GO=1:1, had the lowest sheet resistance value of 900±100 ohms per square.

Figure 2:
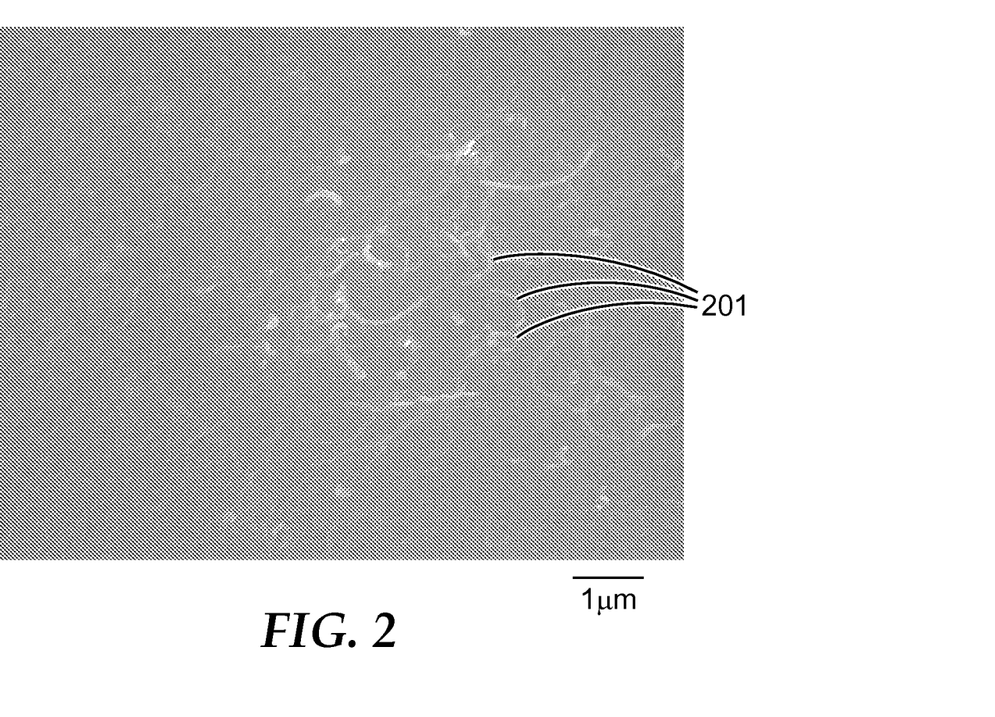
FIG. 2 is a field emission scanning electron microscopy image of an exemplary embodiment of a conductive coating of the present disclosure.

When the initial proportion of MWCNTs to GO sheet material was low, the MWCNTs appeared well-dispersed, as shown for Example 3 in the representative SEM image in FIG. 2. The well-dispersed MWCNTs 201 were thought to form conductive networks that resulted in the observed low sheet resistance.

Example 5 had a higher weight ratio of MWCNTs:GO sheets (i.e., 2:1), and while dispersed MWCNTs were observed via SEM (not shown), small bundles were also observed in the polymer matrix. The conductive coating of Example 5 revealed higher resistivity than in Example 3. Further increasing the proportion of MWCNTs to GO sheets further diminished the conductivity of the PEDOT:PSS coating, as reflected by increased resistivity observed for Example 6.

In order to further understand the surprisingly good dispersant role of GO sheets in Example 3, control experiments were also performed on Comparative Example A-C samples. The concentrations of MWCNTs in Comparative Example B and GO in Comparative Example C were kept the same as those for Example 3, and observed results are summarized in Table 1.

The sheet resistance of Comparative Example B was about 2700 ohms per square, which was lower than that of Comparative Example A; possibly the presence of the MWCNTs improved the conductivity of PEDOT:PSS due to an inherent conductivity of the MWCNTs. However, the sheet resistance of Comparative Example B was nearly 3 times higher than that of Example 3, even though they had equal MWCNT concentration (i.e., 0.2 mg/mL), suggesting a strong dispersant role of GO sheets in Example 3.

The surface morphologies of Example 3 and Comparative Example B were examined via SEM. Finely dispersed MWCNTs were observed in Example 3 samples (e.g., 201 in FIG. 2), while a large MWCNT bundle was visible in Comparative Example B sample (not shown) suggesting that perhaps only a dispersed portion of MWCNTs in Comparative Example B sample contributed to the observed conductivity. MWCNT bundles were also observed in Example 6 samples, where the MWCNT concentration in the conductive ink was calculated to be 0.5 weight percent.

As summarized in Table 1, the Comparative Example C sample had a sheet resistance of 4000±225 ohms per square, which was very close to that of pure PEDOT:PSS coating of Comparative Example A (4100±300 ohms per square), suggesting that GO sheets in the absence of MWCNT did not provide significant additional conductivity beyond that of PEDOT:PSS alone.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

What is claimed is:

1. A conductive ink, comprising:
a conductive polymer solution comprising conductive polymer dissolved in an aqueous-based media; and
a mixture of carbon nanotubes and graphene oxide sheets dispersed in the conductive polymer solution, wherein a weight ratio of the carbon nanotubes to the graphene oxide sheets is in a range from 0.25 to 2.5.

2. The conductive ink of claim 1, wherein the conductive polymer is present in the conductive polymer solution at a concentration in a range from 0.05 weight percent to 10 weight percent, based on a total weight of the conductive polymer solution.

3. The conductive ink of claim 1, wherein the graphene oxide sheets are present in the conductive polymer solution at a concentration in a range from 0.005 weight percent to 0.5 weight percent, based on a total weight of the conductive polymer solution.

4. The conductive ink of claim 1, wherein the conductive polymer is selected from the group consisting of polythiophenes, polyanilines, polyacetylenes, polypyrroles, polycarbazoles, polyindoles, polyazepines, polyfluorenes, polyphenylenes, polyphenylene vinylenes, polyphenylene sulfides, polypyrenes, polyazulenes, and polynaphthalenes, or mixtures thereof.

5. The conductive ink of claim 1, wherein the conductive polymer is selected from the group consisting of poly(3,4-ethylenedioxythiophene), poly(p-phenylene sulfide), poly(p-phenylene vinylene), or mixtures thereof.

6. The conductive ink of claim 1, wherein the conductive polymer is poly(3,4-ethylenedioxythiophene) doped with polystyrene sulfonate.

7. The conductive ink of claim 1, wherein the aqueous-based media comprises a water-miscible organic solvent, wherein the water-miscible organic solvent has a boiling point of up to 150° C. at a pressure of 1 atmosphere.

8. The conductive ink of claim 1, further comprising a conductivity enhancer dissolved in the conductive polymer solution, wherein the conductivity enhancer has a boiling point of at least 150° C. at a pressure of 1 atmosphere.

9. The conductive ink of claim 8, wherein the conductivity enhancer is selected from the group consisting of dimethylsulfoxide, ethylene glycol, diethylene glycol, glycerol, sorbitol, 2-methoxyphenol, or mixtures thereof.

10. The conductive ink of claim 1, wherein the weight ratio of the carbon nanotubes to the graphene oxide sheets is in a range from 0.25 to 2.

11. A method of providing a conductive coating on a substrate, comprising:
applying a conductive ink according to claim 1 to a substrate; and
annealing the conductive ink on the substrate to form the conductive coating on the substrate.

12. An article comprising a substrate having a surface, wherein the surface is coated with a conductive coating according to claim 1.

13. A conductive coating, comprising:
a conductive polymer; and
a mixture of graphene oxide sheets and carbon nanotubes dispersed in the conductive polymer, wherein a weight ratio of the carbon nanotubes to the graphene oxide sheets is in a range from 0.25 to 2.5, and wherein the conductive coating has an optical transmittance value at 550 nm of at least 75%.

14. The conductive coating of claim 13, wherein the graphene oxide sheets are present in a range from 0.1 weight percent to 5 weight percent relative to a total weight of the conductive coating.

15. The conductive coating of claim 13, wherein the conductive coating has an average sheet resistance value in a range from 800 ohm per square to 2800 ohm per square.

* * * * *

UNITED STATES PATENT AND TRADEMARK OFFICE
CERTIFICATE OF CORRECTION

PATENT NO. : 9,803,097 B2
APPLICATION NO. : 14/437536
DATED : October 31, 2017
INVENTOR(S) : HongQian Bao Page 1 of 1

It is certified that error appears in the above-identified patent and that said Letters Patent is hereby corrected as shown below:

In the Specification

Column 2
Line 50, Delete "aldehyhdes," and insert -- aldehydes, --, therefor.

Column 4
Line 14, Delete "Sup" and insert -- Serp --, therefor.

Signed and Sealed this
Fifth Day of June, 2018

Andrei Iancu
*Director of the United States Patent and Trademark Office*